Jan. 24, 1950  H. K. BUSCHER ET AL  2,495,406
DIAMETER GAUGE FOR SMALL BORES
Filed July 1, 1948
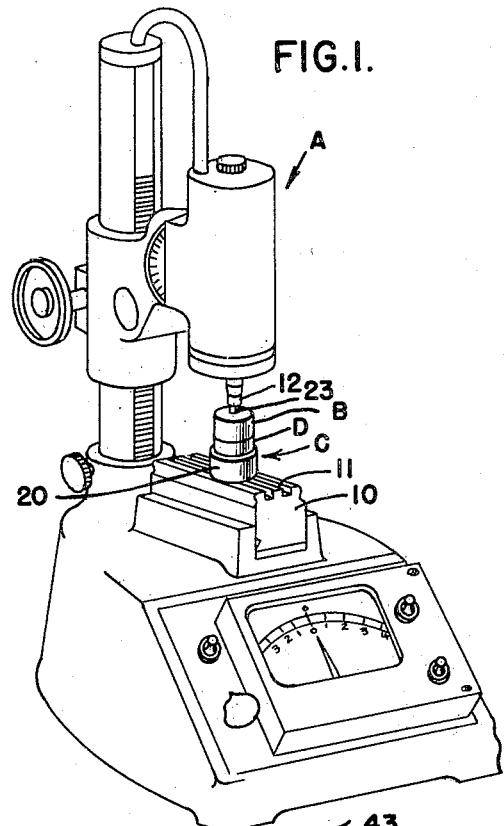
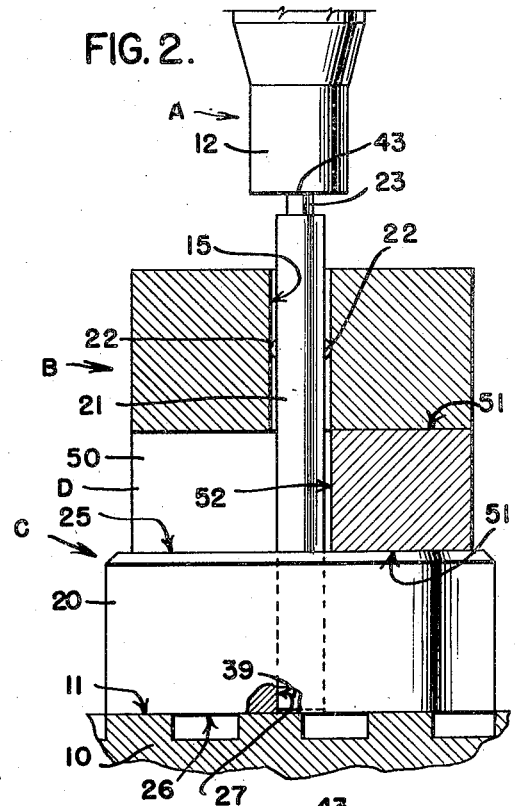
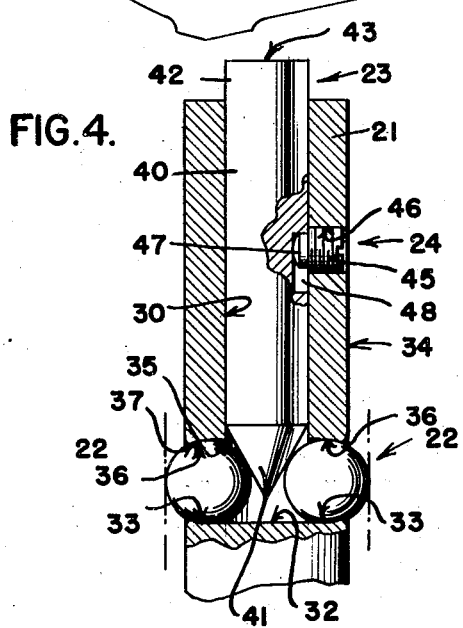
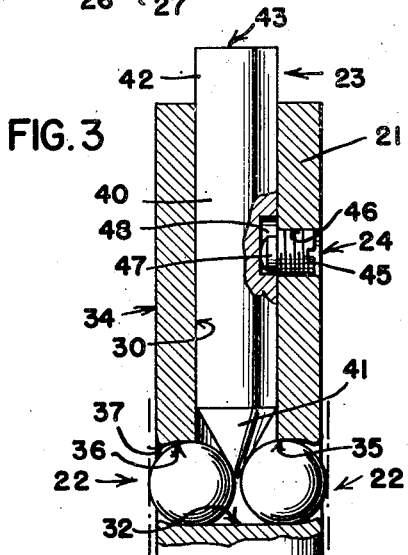
INVENTORS.
Harold K. Buscher
Orpheus Z. Whitenack
BY
ATTORNEYS.

Patented Jan. 24, 1950

2,495,406

UNITED STATES PATENT OFFICE 2,495,406

DIAMETER GAUGE FOR SMALL BORES

Harold K. Buscher and Orpheus Z. Whitenack, Indianapolis, Ind.

Application July 1, 1948, Serial No. 36,468

2 Claims. (Cl. 33—178)

This invention relates to gauges and more particularly to internal diameter gauges for measuring the diameters of bores and the like.

An important object of the invention is to provide a gauge of this kind which is constructed and arranged to not only measure the diameter of a bore at one location but may be employed to check the contours of the bore, for example, at one mouth, at the other mouth and at locations intermediate the mouths. Thus, the bore may be checked for bevel at the mouth and barrel-shape intermediate the mouths.

Another important object is to provide a gauge for this purpose, so constructed that bores of very small diameters may be checked.

Still another important object is to provide such a gauge which is adapted for use with a conventional amplifying comparator.

A further important object is to provide a gauge as described above which will insure the same pressure, while a zero setting is being made by a conventional snap gauge in conjunction with this new gauge, as while the bore is being checked.

Another object is to provide a practical bore or hole gauge which includes no delicate parts, such as springs, nor parts apt to get out of order.

Other objects and advantages of the invention will be apparent during the course of the following detailed description of the invention, taken in connection with the accompanying drawing, forming a part of this disclosure, and in which drawing:

Fig. 1 is a perspective view of a conventional amplifying comparator upon which the new gauge is mounted for checking the bore thru a member.

Fig. 2 is a greatly enlarged elevation of the novel gauge in use.

Fig. 3 is an enlarged vertical section of the gauge of this invention illustrating one checking position of the parts thereof.

Fig. 4 is a like view but illustrating another checking position of the parts.

In the drawing, wherein for the purpose of illustration is shown a preferred embodiment of the invention and wherein similar reference characters designate corresponding parts thruout the several views, the letter A designates a conventional comparator, B a member to be checked for bore diameter and contour, C the novel internal diameter gauge and D an example of a riser block which may be employed therewith.

The comparator A is of well-known construction and includes an anvil 10, having an upper face 11, and a vertically reciprocating spindle 12 above the face 11.

Obviously the member B may be any one of a number of devices provided with a hole or bore 15 to be checked for diameter and contours.

The novel gauge C comprises a base 20, housing 21, a plurality of reciprocating members 22 having arcuate surfaces, carried thereby, reciprocable means 23 to move the members transversely of the housing 20, and means 24 to limit movement of the reciprocable means 23.

Any suitable shape may be provided for the base 20 but there should be a substantially horizontal lower face 26, which lower face, when the gauge C is in use, rests upon the face 11 of the anvil 10 directly below the spindle 12. The base 20 is preferably provided with an axial bore 27 to receive and retain the lower end portion of the housing 21 to be next described.

The housing 21 is, preferably, an elongated member having a smooth bore 30 extending from its upper face to intermediate its length, where the bore ends in a support surface 32. A plurality of transverse openings 33 extend from the bore 30 to the outer face 34 of the housing 21 at this support surface. In the example shown, there are two openings 33 disposed 180° apart and the inner mouth 35 and intermediate portion 36 of each bore are very slightly greater in diameter than the diameter of a member 22 while the outer mouth 37 has a least diameter slightly less than the diameter of any one of the members 22, for a purpose to be subsequently explained. The surface 32 and openings 33 may be disposed intermediate the ends of the housing 21 but above that portion 39 of the housing which extends into the axial bore 27 of the base 20 and this portion may be fixedly secured to the base in any approved way so that the housing 21 extends vertically upwardly from the base. The shape and disposition of the support surface 32 is preferably such that the members 22 will not tend to roll outwardly due to gravity, altho this surface may be such that they will tend to roll inwardly due to gravity.

Each reciprocating member 22 is substantially like the others and may be a sphere, with a diameter slightly less than the diameter of those portions 35 and 36 of the openings 33 and a diameter slightly greater than those of the mouths 37 of the openings 33.

The reciprocable means 23 to move the members 22 thru the openings 33 is preferably a cylindrical plunger 40 having a downwardly-converging lower end portion 41. This end portion may be a cone, and is, in effect, a cam face, constructed and arranged to contact those portions of the members 22 extending into the bore 30. The upper end portion 42 of the plunger 40 extends outwardly of the upper end of the housing 21 and preferably has an upper, preferably substantially horizontal face 43, to be engaged by the lower end of the spindle 12, as in Fig. 2. The plunger 40 is slidable thru the bore 30 of the housing 21.

Referring to Figures 3 and 4, the means 24 to limit movement of the reciprocable member 23 may be a set screw 45 threaded into a screw threaded transverse bore 46 in the housing 21 above the openings 33 and having a portion 47 which normally extends into the bore 30, and the walls of a longitudinally-extending slot 48 in the plunger 40 above the lower end portion 41 thereof. The length and position of the slot 48 is such that the plunger may, at its uppermost limit of movement, permit the members 22 to move substantially inwardly of the vertical plane of the face 34 and, at its lowermost limit of movement, the plunger will not contact the lowermost wall of the opening 33 but may move the members 22 to project outwardly to their extreme limits. Of course, the means 24 also prevents the plunger 40 from dropping from the housing 21 in the event the gauge C were inverted.

The association of parts of the gauge C as described permits the use of a very slender housing 21. For example, we have constructed accurately-working models with a housing diameter of one-eighth inch, a length from base 20 to the upper end of seven-eighths inch, and a bore of one-sixteenth inch. Consequently, the new gauge may check bores or holes of very limited diameters.

In order to check various portions of the length of a bore or hole, we provide a suitable number of riser blocks, one of which is shown at D. The only differences in the riser blocks are in their heights. Each comprises a body portion 50 having a pair of substantially parallel faces 51 and an axial bore 52 from face to face.

In using the novel gauge C, in conjunction with a conventional comparator A, the gauge of the latter is set at zero by use of a snap gauge and the gauge C which latter gauge is wrung to the anvil 10 at the time. In the event the general diameter of a bore or hole in a member B is to be checked, the member B is set upon the base 20 with the bore 15 of the former surrounding the lower part of the housing 21 and the openings 33 facing this bore 15. When the spindle 12 is lowered it will contact the plunger 40 and force it downwardly, thus spreading the members 22 apart, as in Figure 3 or Figure 4, for example, and the exerted pressure will be the same as was exerted on the gauge block snap gauge while the zero setting was being made.

Should it be desired to check the member B for variations in the contour of the bore 15, a riser block, such as the block D may be employed to elevate the member B, as in Fig. 2. Obviously, if after the check of the intermediate portion of the bore of the member D as in Fig. 2 is completed, a riser block D of less height is substituted for the riser block shown in Fig. 2, the mouth portions of the bore 15 may be checked (one mouth portion being checked, of course, by inverting the member B).

Various changes may be made to the form of the invention herein shown and described without departing from the spirit of the invention or scope of the claims.

What is claimed is:

1. In an internal diameter gauge, a base, an elongated slender housing extending therefrom and provided with an outer face, a slender longitudinal bore, opening to said face, and a plurality of transverse openings from said bore to the exterior of said housing, a plunger, including a portion within said bore and slidable over the wall surface thereof, from said end face to said transverse openings, and a portion outwardly of said face, with the portion within said bore provided with a cam at its free end, a plurality of reciprocable members, one in each opening and each having a like portion extending into said bore and in the path of travel of said cam, and a like portion constructed and arranged to project outwardly of said exterior of said housing upon movement of said plunger toward said base.

2. In an internal diameter gauge for association with the spindle of a comparator, a base, an elongated slender cylindrical housing extending therefrom and having the same outer diameter throughout its length, said housing being provided with a longitudinal bore and a plurality of transverse openings from said bore to the exterior of said housing, a plunger, including a portion within said bore, and slidable over the face of the wall of said bore, and a portion outwardly thereof, with the portion outwardly thereof having an exposed end face constructed and arranged to be contacted by the spindle, and with the portion inwardly of said bore provided with a cam at its free end, and a plurality of reciprocable members, one in each opening and each having a like portion extending into said bore and in the path of travel of said cam, and a like portion constructed and arranged to project outwardly of said exterior of said housing upon movement of said plunger toward said base.

HAROLD K. BUSCHER.
ORPHEUS Z. WHITENACK.

REFERENCES CITED

The following references are of record in the file of this patent:

UNITED STATES PATENTS

| Number | Name | Date |
| --- | --- | --- |
| 1,550,671 | Brault | Aug. 25, 1925 |
| 2,369,319 | Smith | Feb. 13, 1945 |